United States Patent [19]

Martin et al.

[11] 4,007,759

[45] Feb. 15, 1977

[54] PRESSURE STABILIZER FOR HYDROCARBON STORAGE FACILITIES

[75] Inventors: William R. Martin, Willow Grove; Stewart W. Nystrom, Malvern, both of Pa.

[73] Assignee: Sun Oil Company of Pennsylvania, Philadelphia, Pa.

[22] Filed: Sept. 15, 1975

[21] Appl. No.: 613,141

[52] U.S. Cl. .............................. 137/550; 55/420; 98/122; 137/513.5; 220/372

[51] Int. Cl.² ........................................ F16K 15/04

[58] Field of Search ........... 98/42, 52, 122; 55/355, 55/420, DIG. 19; 137/549, 550, 513.3, 513.5, 513.7, 533.11; 210/117, 120; 220/202, 203, 372, 85 VS

[56] References Cited

UNITED STATES PATENTS

| | | | |
|---|---|---|---|
| 2,532,888 | 12/1950 | Brown | 55/420 |
| 2,781,941 | 2/1957 | Lindsay | 220/372 X |
| 3,057,115 | 10/1962 | Bilanin | 137/550 X |
| 3,062,525 | 11/1962 | Schutmaat | 137/513.5 X |

*Primary Examiner*—Robert G. Nilson
*Attorney, Agent, or Firm*—J. Edward Hess; Donald R. Johnson; Gary V. Pack

[57] ABSTRACT

A pressure stabilizer for use in hydrocarbon storage facilities which acts as an orifice and also permits the pressure in the system to be stabilized when it reaches a given amount. The stabilizer has a casing with a valve seat and a heavy ball located above the valve seat so that the ball is forcibly displaced upwards when the pressure in the hydrocarbon storage facility reaches an amount sufficient to lift the weight of the ball. Support members extending from the side of the valve seat suspend the ball away from the valve seat a sufficient distance to form the appropriate sized orifice and to minimize contact of the ball to the casing so that the possibility of the stabilizer being frozen closed is minimized.

5 Claims, 3 Drawing Figures

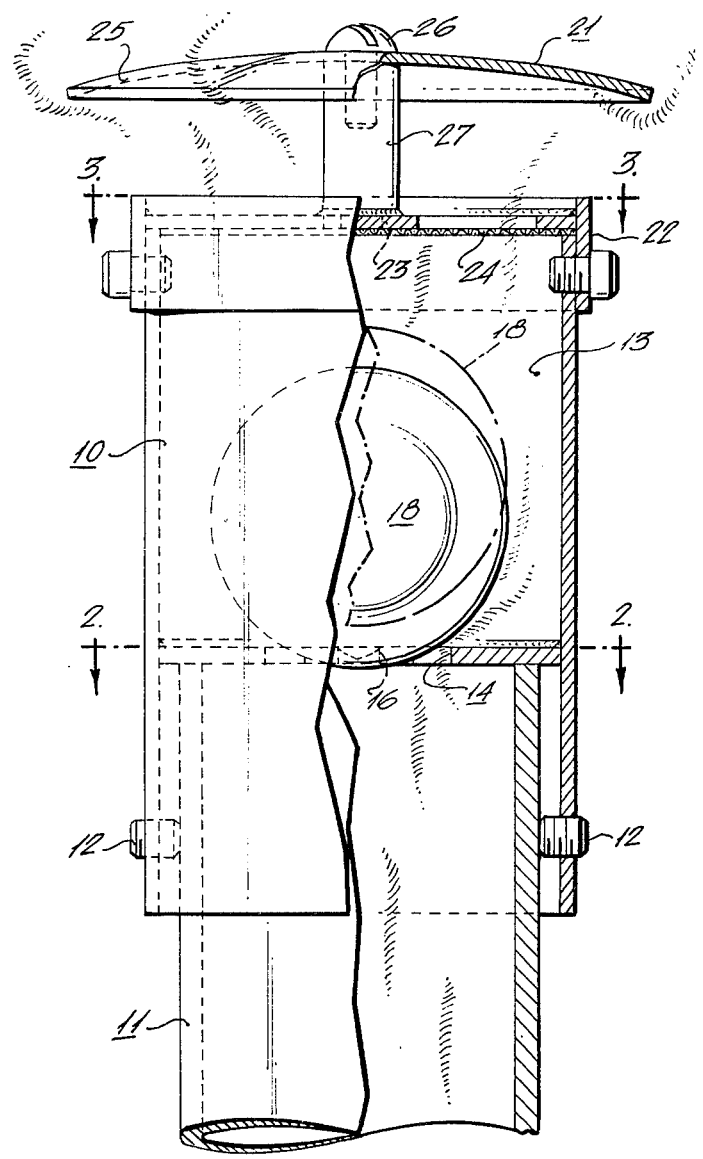
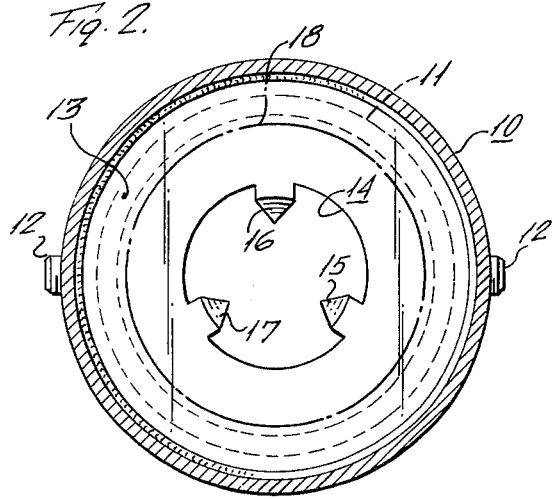
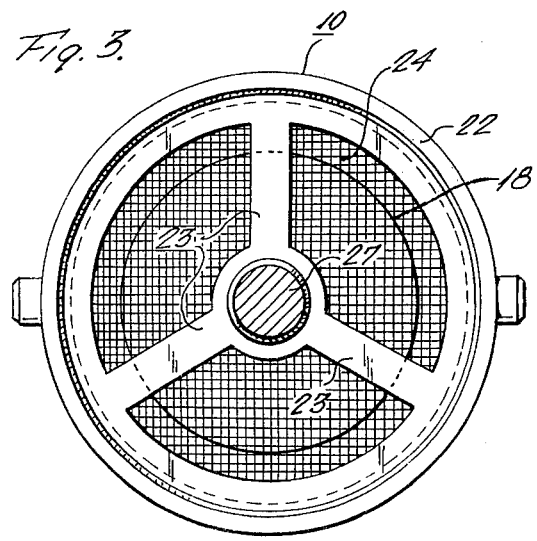

PRESSURE STABILIZER FOR HYDROCARBON STORAGE FACILITIES

BACKGROUND OF THE INVENTION

This invention is related to venting and pressure relief systems for use in hydrocarbon storage facilities and more particularly to those systems which stabilize the pressure using the weight of an object.

It is current practice in the petroleum industry to have vent lines running from the underground storage tanks at a service station to an above ground location so that the pressures and vapors in the tanks can be released into the atmosphere. However, environmental regulations will require some restriction on the end of these vent lines to reduce the escape of hydrocarbons into the air.

Several types of pressure/vacuum valves are currently available on the market to perform this function. Most of these devices employ springs to control the relief pressures. However this often proves to be unreliable because the spring forces tend to vary with age, weather conditions, and other factors. Also, the possibility exists for the components to become frozen together because of the moisture trapped therein during subfreezing temperatures. In addition, these type of valves can be fairly complicated to make and therefore quite expensive.

SUMMARY OF THE INVENTION

In accordance with a preferred embodiment, a reliable pressure stabilizer system is disclosed which is simple in construction and reliable in all kinds of weather conditions. This design includes a stabilizer casing which has a chamber with a valve seat located in the lower portion of the chamber. Spaced around the valve seat are elongated support members which hold a weighted ball away from the valve seat at a distance from the valve seat sufficient to form an orifice of the desired size. The weighted ball is designed to have a sufficient amount of weight so that it will be displaced upward when the pressure in the vent line which leads to the underground tanks reaches above a given amount, for example 2.5 lbs.

One advantage to this system is that if any water enters the chamber, it drains down through the vent pipe and does not become trapped around the stabilizing device within the chamber. Since the ball is suspended by only three supports, the probability of it becoming frozen to the supports is much less than in other more conventional valves. Also, the design permits easy manufacturing of the system at a minimum cost.

A better understanding of the invention and its advantages can be seen in the following description of the Figures and the preferred embodiment.

DESCRIPTION OF THE DRAWINGS AND PREFERRED EMBODIMENT

FIG. 1 is a partial section of the pressure stabilizer in accordance with the invention.

FIG. 2 is a sectional view of the stabilizer housing with along the line 2—2.

FIG. 3 is a sectional view of the stabilizer along the line 3—3.

In FIG. 1, stabilizer housing 10 is shown mounted on the end of vent line 11 and secured thereto by set screws 12. Stabilizer housing 10 has a chamber 13 with a valve seat 14 located in its lower portion. At least three support members 15, 16 and 17 extend into the valve seat opening and are secured in the bottom of chamber 13. Weighted ball 18 rests in its normal position upon support members 15, 16 and 17, thereby leaving sufficient space between the ball 18 and valve seat 14 to form an appropriately sized orifice.

Preferably, upper chamber 13 has a size sufficiently larger than ball 19 so that if the pressure in the underground storage tanks ever reaches the predetermined amount, the vapors have sufficient room to flow around ball 18 and out through the top of chamber 13. It is also preferable to have the size of chamber 13 small enough so that ball 18 will return to its proper location on members 15, 16 and 17 after it has been raised by the excess pressure and not come to rest around the side of valve seat 14. The size of ball 18 with respect to the opening formed by valve seat 14 must be specifically determined so that the space between valve seat 14 and ball 18 has an area approximately equal to the size orifice permitted by the environmental regulations.

Also, it is desirable that upper chamber 13 have some form of cover to keep out insects as well as the weather. One possible cover design is illustrated in FIGS. 1 and 3. Cover 21 has a lower frame 22 which fits around the upper edge of chamber 13 and has cross supports 23 extending to its center. A screen 24 is positioned across the open section of frame 22. A roof 25 is secured to the center of cross supports 23 at a sufficient distance above screen 24 so that in the event sufficient pressure for raising ball 18 is reached in the underground tanks, enough room between screen 24 and roof 25 is present to permit maximum flow of the escaping gases. Roof 25 is secured to cross member 23 through bolt 26 threaded into spacer 27 which maintains roof 25 at its correct position with respect to screen 24.

During normal operation, ball 18 is resting on supports 15, 16 and 17. Small amounts of pressure differences between atmospheric pressure and the pressure in the underground storage tanks will be equalized by the orifice formed between valve seat 14 and ball 18. However, if the pressure should rise suddenly in the underground tanks and reach the predetermined amount, ball 18 will be displaced upward, away from the valve seat, thereby permitting the gases to escape around ball 18 and out through screen 24. When the pressure has been fully stabilized below this predetermined amount, ball 18 returns to its normal position. The weight of ball 18 and its size with respect to the size of valve seat 14 and chamber 13 determine the amount of pressure required to displace ball 18 upward.

While a particular embodiment of this invention has been shown and described it is obvious that changes and modifications can be made without departing from the true spirit and scope of the invention. It is the intention of the appended claims to cover all such changes and modifications.

The invention claimed is:

1. A pressure stabilizer system for use on a vent line from a hydrocarbon storage facility, said stabilizer designed to maintain an orifice open to the atmosphere, to release any pressure above a predetermined amount, and to minimize the effect of weather conditions on its operation, and comprising:

a. a stabilizer housing, having means for connection to the vent line and a valve seat;

b. a movable valve member having a given weight to provide said member with a specific gravity greater than one, so that a predetermined amount of pressure applied under the movable member will displace it upward from its normal position; and c. a plurality of support members spaced from each other for maintaining the movable valve member away from the valve seat in its normal position so that an orifice having a predetermined area is formed between the movable member and the valve seat and so that the contact by the valve seat with the movable member is eliminated and the contact by the maintaining means with the movable member is minimized to reduce the possibility of the movable member becoming frozen in its normal position, thereby being unable to be displaced upward if the pressure to be relieved reaches the predetermined amount.

2. A pressure stabilizer system for use on a vent line from a hydrocarbon storage facility, said stabilizer designed to maintain an orifice open to the atmosphere, to release any pressure above a predetermined amount, and to minimize the effect of weather conditions on its operation, and comprising:

a. a stabilizer housing, having means for connection to the vent line and a valve seat with a smooth, regularly shaped circumference;

b. a movable valve member having a given weight to provide said member with a specific gravity greater than one, so that a predetermined amount of pressure applied under the movable member will displace it upward from its normal position; and c. means for maintaining the movable valve member away from the valve seat in its normal position so that an orifice having a predetermined area is formed between the movable member and the valve seat and so that the contact by the valve seat with the movable member is eliminated and the contact by the maintaining means with the movable member is minimized to reduce the possibility of the movable member becoming frozen in its normal position, thereby being unable to be displaced upward if the pressure to be relieved reaches the predetermined amount, wherein said maintaining means comprises at least three support members extending inwardly from the circumference of the valve seat, each support member having a contact point at the opposite end from the valve seat which is the only place of contact with the movable member on each support member.

3. The stabilizer system recited in claim 2 wherein the housing has mounted on its upper section a screen cover and a roof suspended above the screen cover.

4. The stabilizer system recited in claim 2, wherein the movable member is a ball.

5. The stabilizer recited in claim 2 wherein the number of support members is three.

* * * * *